United States Patent [19]

Barry

[11] Patent Number: 5,685,462
[45] Date of Patent: Nov. 11, 1997

[54] EXTRUDING APPARATUS WITH IMPROVED DRIVE SYSTEM

[75] Inventor: Hubert M. Barry, Lethbridge, Canada

[73] Assignee: Power B International Inc., Lethbridge, Canada

[21] Appl. No.: 587,322

[22] Filed: Jan. 16, 1996

[51] Int. Cl.$^6$ .................................................. G01F 11/20
[52] U.S. Cl. ................................... 222/262; 222/333
[58] Field of Search ............................ 222/255, 256, 222/260, 261, 262, 340, 276, 333, 387, 404, 376, 383.2, 383.1; 184/27.2, 105.2

[56] References Cited

U.S. PATENT DOCUMENTS

| | | | |
|---|---|---|---|
| 1,858,155 | 5/1932 | Harris | 222/262 |
| 1,905,913 | 4/1933 | Kopp | 222/262 |
| 1,956,144 | 4/1934 | Brown | 222/262 |
| 1,975,311 | 10/1934 | Creveling | 222/262 |
| 2,461,332 | 2/1949 | Leonard | 222/256 |
| 4,257,540 | 3/1981 | Wegmann et al. | 222/262 |
| 5,404,967 | 4/1995 | Barry | 222/333 |
| 5,544,791 | 8/1996 | Chih | 222/333 |

OTHER PUBLICATIONS

Lincoln Product Bulletin "Pistol Grip Grease Gun", Copyright 1987, printed in U.S.A.

*Primary Examiner*—Philippe Derakshani
*Attorney, Agent, or Firm*—John R. Uren

[57] ABSTRACT

An improved drive system for an extruding apparatus. A piston is mounted for reciprocal movement within a cylinder and moves between a power stroke wherein fluid is extruded from the cylinder and a return stroke wherein fluid is allowed to enter the cylinder. The piston is moved by a throw mounted to a crank. The plane of the axis of the crank is offset from the plane of movement of the piston within the cylinder. The plane of movement of the throw axis is parallel to the plane of movement of the piston during at least a portion of the power stroke of the piston. The throw is circular and the force exerted on the pistons by the throw during the portion of the power stroke is parallel to both planes of movement of the pistons thereby to avoid any sidewise and unequal loading on either one of the pistons.

17 Claims, 6 Drawing Sheets

EXTRUDING APPARATUS WITH IMPROVED DRIVE SYSTEM

INTRODUCTION

This invention relates to an extruding system and, more particularly, to an extruding system particularly useful in association with a grease gun which extruding system has an improved drive system for operating the movable extruding units.

BACKGROUND OF THE INVENTION

In U.S. Pat. No. 5,404,967 entitled EXTRUDING DEVICE which issued Apr. 11, 1995 and which names the same inventor, the contents of which are incorporated herein by reference, there is disclosed and claimed an extruding device used to extrude grease and other fluids, typically to male grease fittings which provide lubrication for moving parts. The extruding device according to the aforementioned United States patent teaches two pistons, each piston being reciprocal in a respective passageway and being movable simultaneously in the same direction to discharge fluid from the passageways in which they move.

The two pistons reciprocated in their respective passageways. The two pistons were joined to a piston mounting block with a drive pin extending therefrom. The drive pin fitted into a drive groove formed in a rotating cam. As the cam rotated about an axis, the drive block and, therefore, the attached pistons reciprocated.

While the system worked reasonably well, premature failure of the drive pin was noted. It is fairly well determined that the source of the failure lay in the high loading on the pistons caused by the grease in the fluid passageways in which the pistons moved. Because this loading was variable and ranged through a relatively large quantity of forces being exerted on the pistons and likewise because the drive pin was a cantilever type member extending from the mounting block, the forces were sufficient to cause failure of the drive pin thereby causing a prematurely short life of the drive pin and failure of the entire system.

Yet a further disadvantage of the previous system is that the forces were highest, expectedly so, on the power stroke of the extruding operation. Thus, if failure was anticipated, it would be logical to expect it to occur on the power stroke. The design of the drive system of the extruding apparatus according to the '967 patent did nothing to assist a reduction in these forces and a more even application of force throughout the power and suction strokes of the system.

SUMMARY OF THE INVENTION

According to one aspect of the invention, there is provided an extruding apparatus to extrude fluid from at least one cylinder having a cylinder axis by a piston mounted for reciprocal movement within said cylinder during power and return strokes, said power stroke of said piston extruding fluid from said cylinder and said return stroke of said piston allowing fluid to enter said cylinder, said piston being operably moved within said cylinder and parallel to said cylinder axis by a crank member having a crank member axis, said crank member having a throw with a throw axis, said throw axis being offset from said crank member axis, said throw being in contact with said piston during said power stroke of said piston, a bias member operable to bias said piston into a contacting relationship with said throw during movement of said piston within said cylinder on said return stroke of said piston, said throw axis moving along a plane which is parallel to said plane of movement of said piston during a substantial portion of said power stroke of said piston.

According to a further aspect of the invention, there is provided an extruding apparatus to extrude fluid from at least one cylinder, said extruding apparatus comprising a piston movable within said cylinder between power and return strokes, a crank rotatable about a crank axis and a throw mounted to said crank, said throw having a throw axis and being rotatable about said crank axis, said throw axis being offset from said crank axis, said apparatus further comprising a bias member operable to move said piston into operable contact with said throw during said return stroke of said piston.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
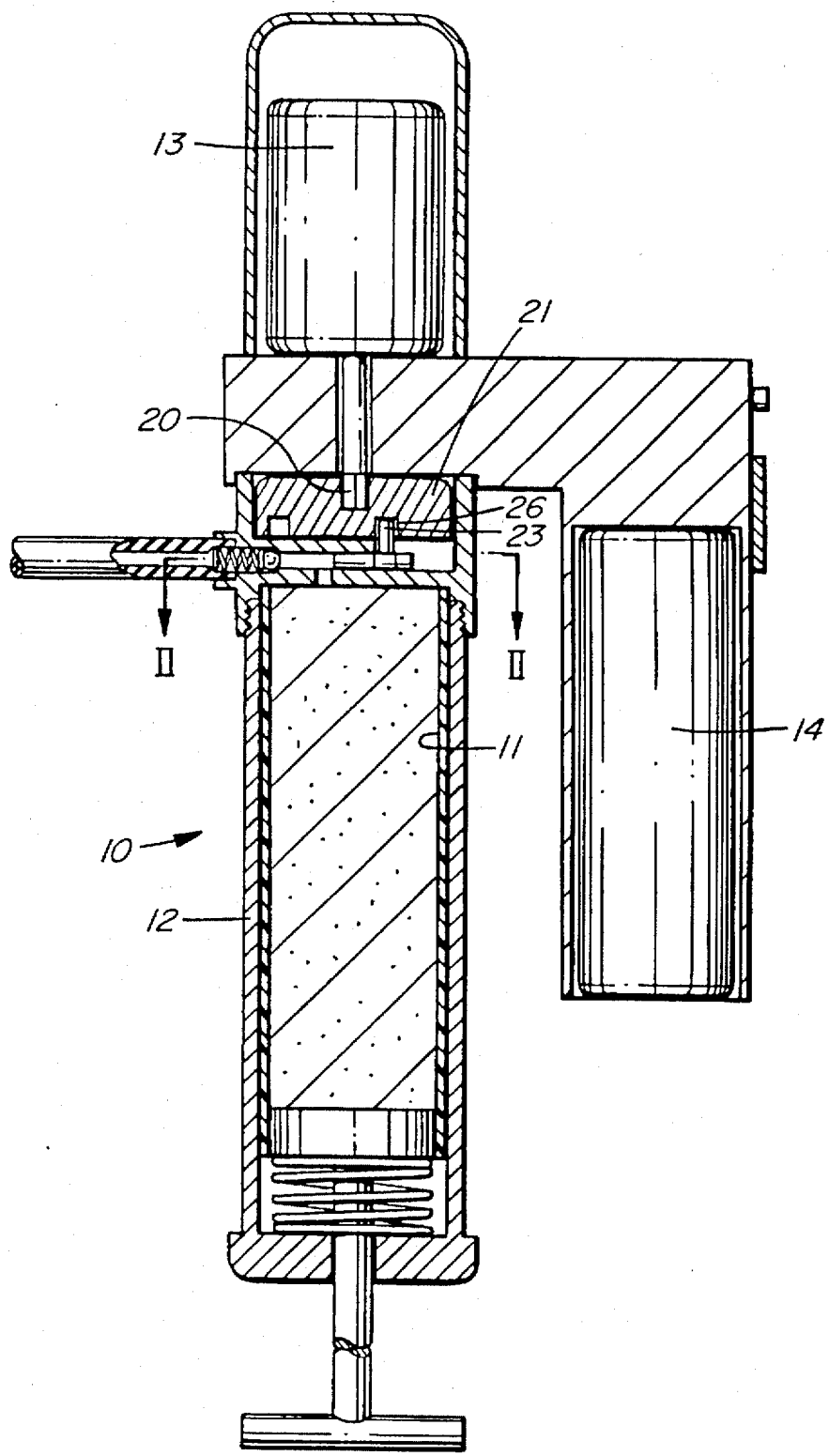
FIG. 1 is a diagrammatic partial section side view of the grease gun or extruding device according to U.S. Pat. No. 5,404,967.
Figure 2:
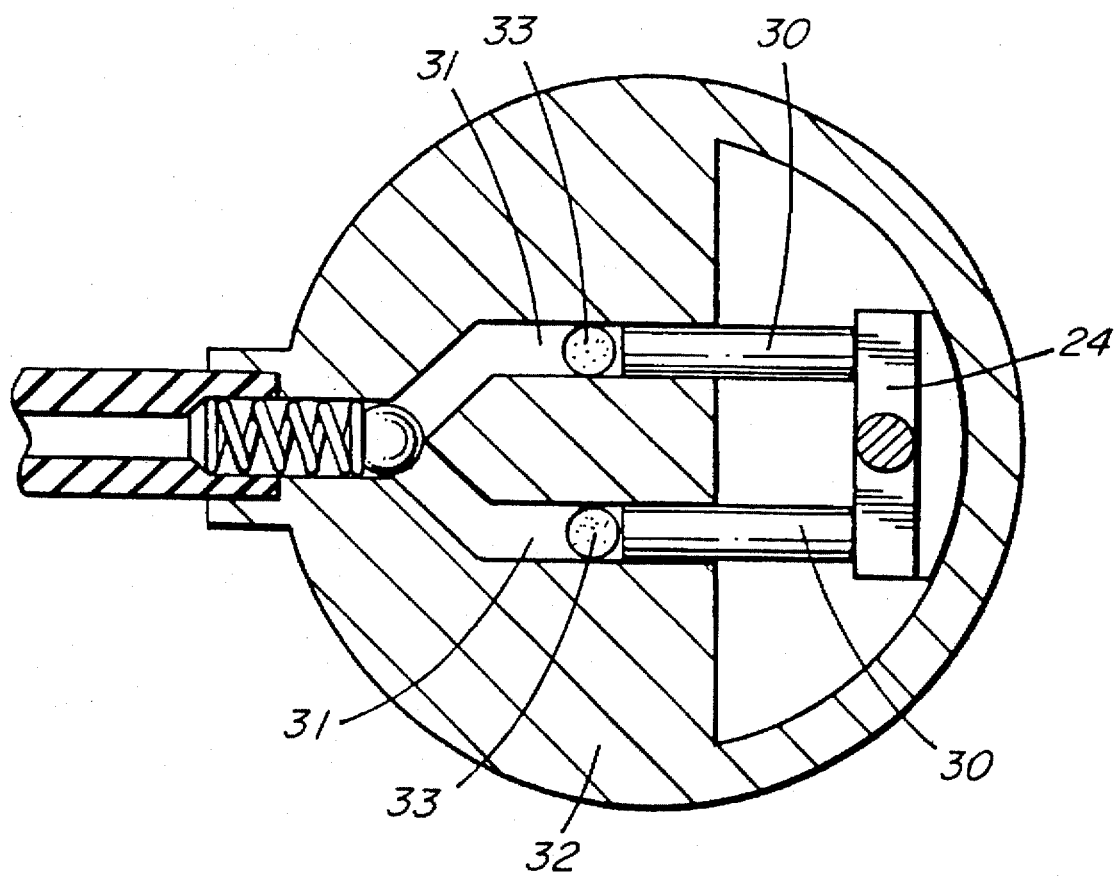
FIG. 2 is sectional view of the drive system of the extruding device according to the '967 patent taken along II—II of FIG. 1.

Reference is now made to FIG. 1 which illustrates a grease gun according to U.S. Pat. No. 5,404,967. Briefly, the grease gun generally illustrated at 10 comprises a cartridge 11 mounted within a cartridge housing 12. A motor 13 which is electrically operated by a battery 14 rotates a shaft 20 connected thereto. Shaft 20 rotates a cam 21 with a cam groove 26 machined therein. A drive pin 23 is in operable contact with the cam groove 26 and is connected to a piston mounting block 24 (FIG. 2).

As the cam 21 rotates, the drive pin 23 will move along a path parallel to the path 25 of pistons 30. However, the force applied to the drive pin 23 by the cam groove 26 will not act along the piston path 25 but will exert force on the drive pin 23 at various angles to the piston path 25 depending on the position of the cam 21 as it rotates about the axis of shaft 20.

The disadvantages of the prior art just described are evident. First, the drive pin 23 is a cantilever type arrangement which protrudes from the piston mounting block 24. As the pistons 30 encounter significant resistance from the grease within the cylinders 31 in which the pistons 30 move, high forces will be exerted on the drive pin 23 by the cam groove 26 in which the drive pin 23 is moving in order to extrude the fluid which conveniently will be grease. Pressure in the range of 10000 p.s.i. is necessary and this pressure clearly results in high loading between the cam groove 26 and the drive pin 23. Thus, premature failure of the drive pin 23 is possible and probable according to the design without taking costly efforts to enhance the strength of the drive pin 23 and cam groove 26. Likewise, and secondly, the force of the cam groove 26 on the drive pin 23 is not parallel to the path of the pistons 30. High side loading on the pistons 30 and the housing 32 results and again, dictates a stronger material which increases tooling and parts costs.

Figure 3:
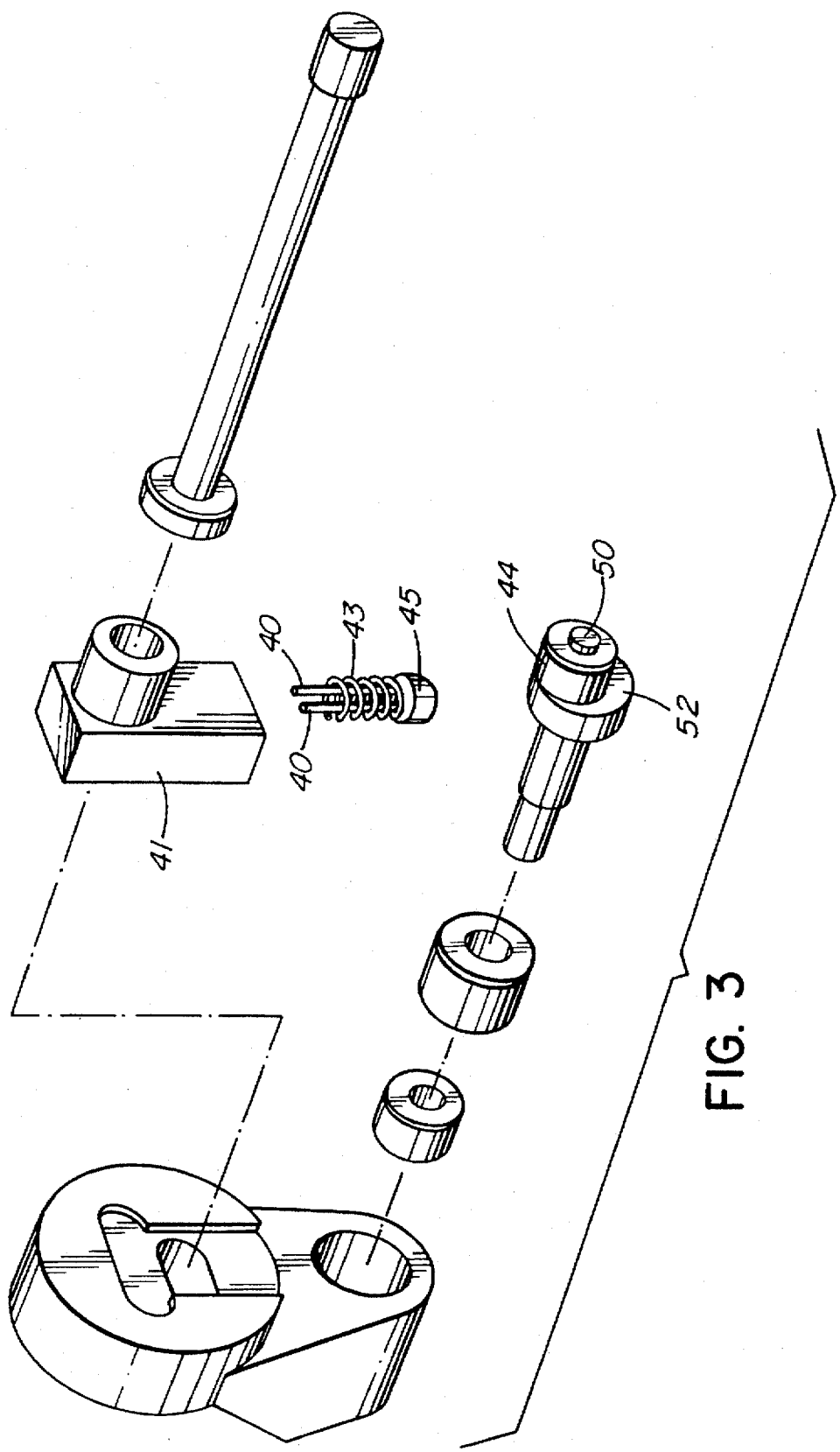
FIG. 3 is an exploded view of the drive system according to the present invention.
Figure 4A:
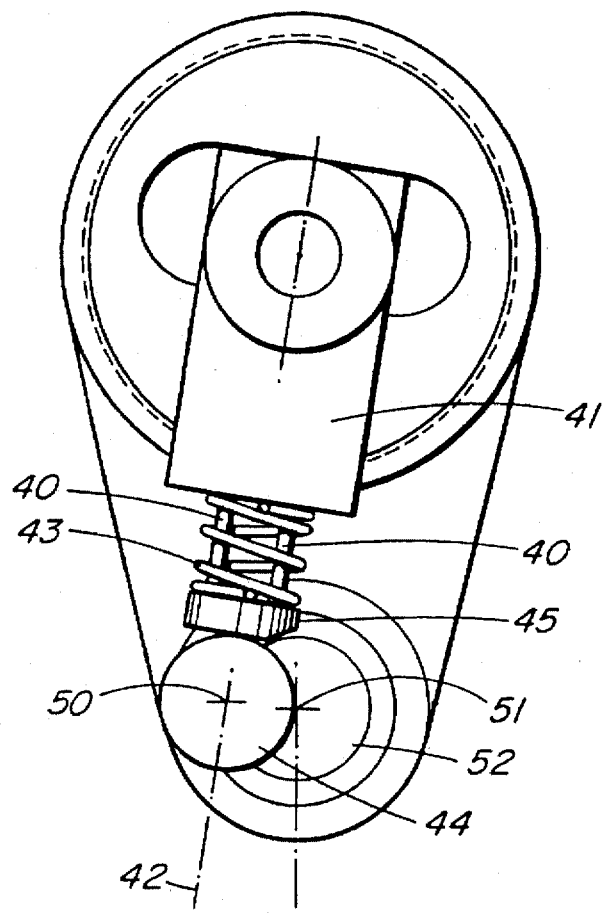
FIG. 4A is a diagrammatic plan view of the drive system according to the present invention.

Reference is now made to FIGS. 3, 4A, 4B and 5. A pair of pistons 40 move within a piston housing or pump casing 41 along a piston path or axis 42 (FIG. 4A). Grease or fluid is supplied to the piston housing 41 in the same manner as illustrated in FIG. 2. i.e., through the inlet ports 33. The pistons 40 are connected to a piston mounting block 45 and a biasing member, conveniently a spring 43 acts between the piston housing 41 and the piston mounting block 45 to maintain the piston mounting block 45 in contact with a throw 44 having a throw axis 50 which, of course, is offset from the crank axis 51 of crank 52. The crank 52 is rotated by a motor (not illustrated) similar to the rotation of the shaft 20 in the prior art embodiment of FIG. 1.

It is desirable to reduce side loading on the pistons 40 as much as practically possible after the pistons 40 have reached their top dead center position. To that end, a relief angle 46 (FIG. 4B) can be conveniently provided on the trailing edge of the mounting block 45 as illustrated.

OPERATION

In operation, battery power will be applied to the motor (not illustrated) and by a control (not illustrated), the operator will commence operation of the crank 52 (FIGS. 3 and 4). The throw 44 will rotate with crank 52 and spring 43 will maintain the piston mounting block 45 in contact with the throw 44 as it rotates.

Figure 4B:
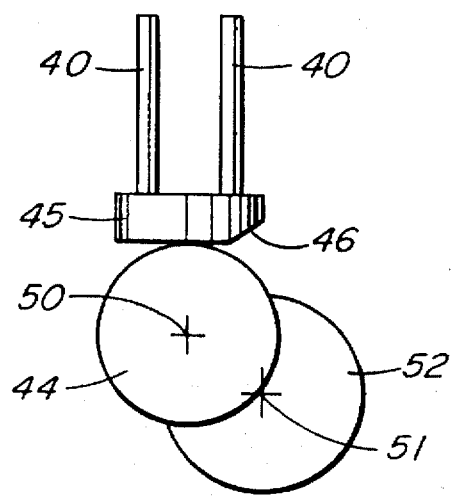
FIG. 4B is a diagrammatic plan view similar to FIG. 4A but particularly illustrating a relief angle formed on the piston mounting block.

On the power stroke of the pistons 40 (i.e., when grease is being extruded from the piston housing 41), the pistons 40 will move inwardly relative to the piston housing 41 (FIG. 4) as the crank 52 rotates clockwise as seen in FIGS. 4A and 4B. Because the axis 42 of the piston housing 41 and, consequently, the axis 42 of pistons 40 is offset to one side of the axis of crank 52, the axis 50 of throw 44 will more closely approximate the axis 42 during the power stroke of the pistons 40 and the forces applied to the piston mounting block 45 by the throw 44 will generally be perpendicular thereto, particularly during the period of maximum movement of the throw 44 over a given time period during the power stroke (i.e., when the throw is 90 degrees from its top dead center position). Sidewise loading on the pistons 44 is thereby considerably reduced or substantially eliminated during the power stroke of the pistons 40.

Following the power stroke of the pistons 43, the throw will, of course, exert a force on the piston mounting block 45, that will allow for sidewise loading between the pistons 40 and the piston housing 41. However, the absence of any force required to extrude the fluid from the piston housing will dictate sidewise forces only a fraction of those occurring on the power stroke and these forces are not of concern in designing the apparatus. These forces are provided only by the spring force between the piston mounting block 45 and the piston housing 41 which maintains the piston mounting block 45 in contact with the throw 44 during the return stroke.

Figure 5A:
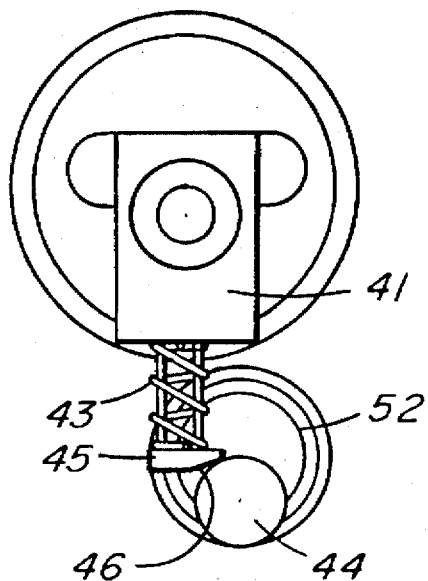
FIG. 5 is a series of plan views similar to that of FIGS. 4A and 4B but illustrating the movement of the pistons during their power or extruding strokes.
Figure 5B:
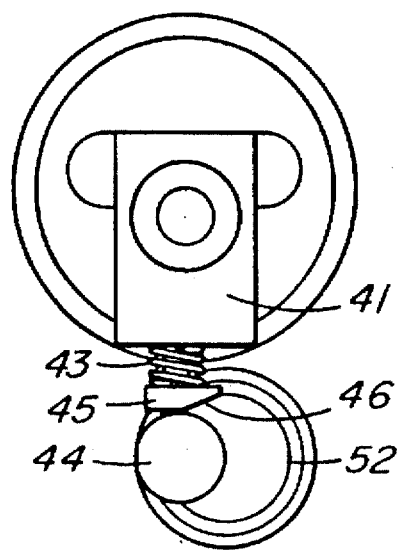
Figure 5C:
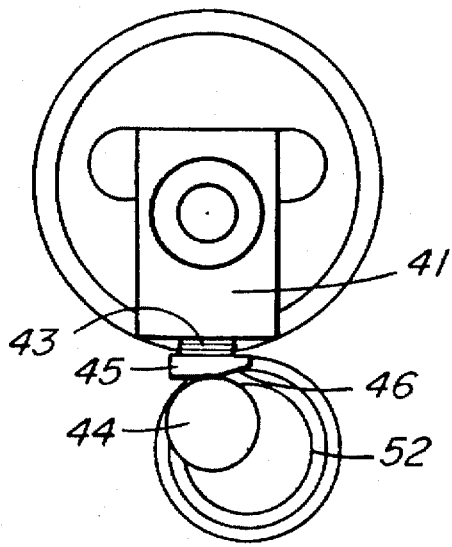
Figure 6:
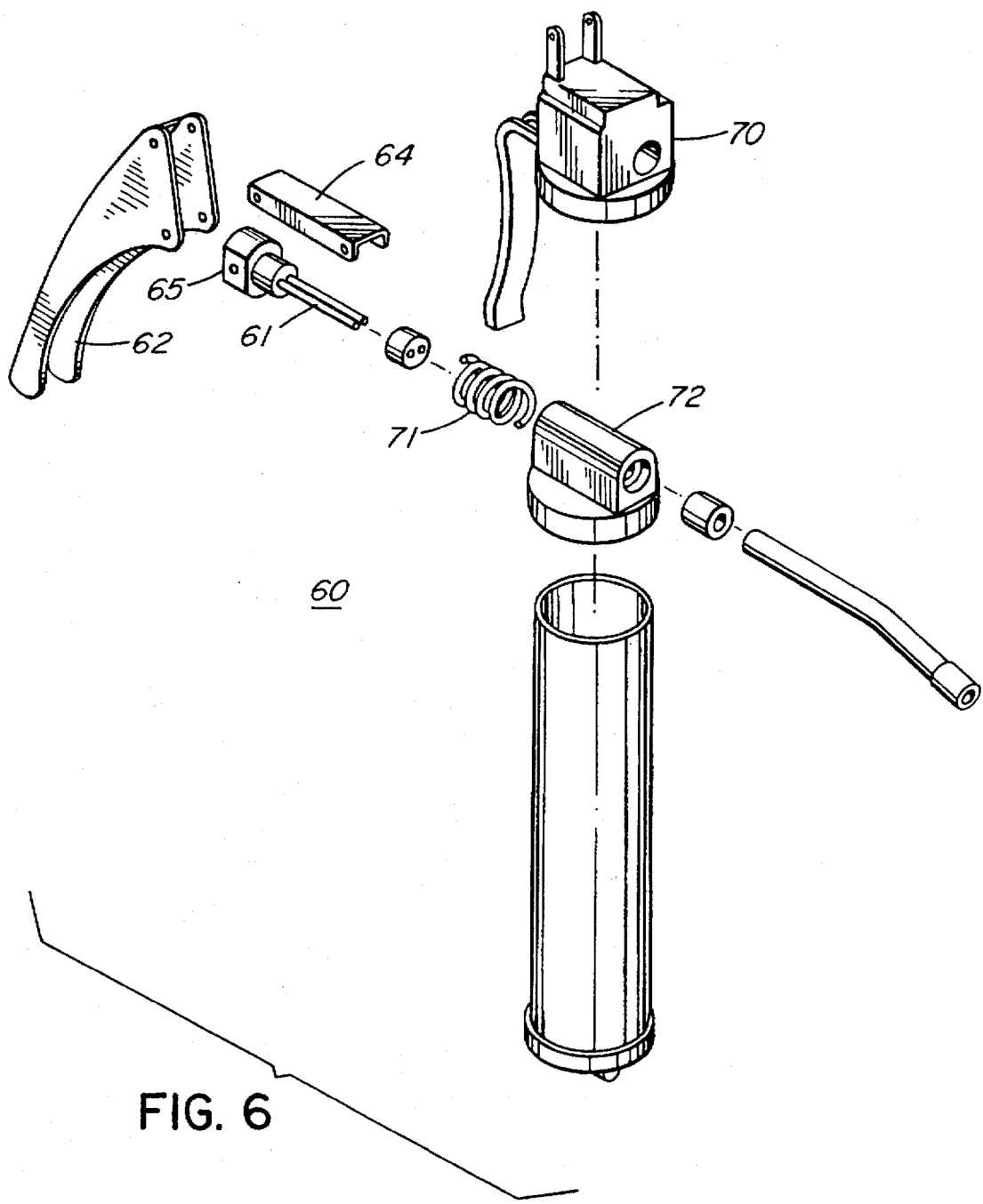
FIG. 6 is a view of an extruding device according to a further embodiment of the invention which is manually or hand operated without a source of power.

Reference is now made to FIG. 6 which illustrates a manually operated extruding device, conveniently a grease gun generally illustrated at 60. As described, however, the force provided on the pistons 61 is not supplied by a motor but, rather, manually by the operator who exerts force on a handle 62 which is connected to the piston mounting block 63 and to a link 64 which extends on the opposite end to a grease gun case 70. A spring 71 provides return force on the pistons 61 following the power stroke and moves the handle 62 to its rest position as illustrated in FIG. 5B.

In operation, the force exerted on the pistons 61 by the handle 62 acting on the piston mounting block 63 will be axially along the same path as that in which the pistons 61 move. Thus, there is little or no side loading on the pistons 61 and little sidewise loading between the pistons 61 and the pump housing 72 in either the power or return strokes of the pistons 61.

Many modifications will readily occur to those skilled in the art to which the invention relates and the particular embodiments described herein should be taken as illustrative of the invention only and not as limiting its scope as defined in accordance with the accompanying claims.

I claim:

1. An extruding apparatus to extrude fluid from at least one cylinder having a cylinder axis by a piston mounted for reciprocal movement within said cylinder during power and return strokes of said piston, said power stroke of said piston extruding fluid from said cylinder and said return stroke of said piston allowing fluid to enter said cylinder, said piston being operably moved within said cylinder and parallel to said cylinder axis by a crank member having a crank member axis, said crank member having a throw with a throw axis, said throw axis being offset from said crank member axis, said throw being in operable contact with said piston during said power stroke of said piston, a bias member operable to bias said piston into a contacting relationship with said throw during movement of said piston within said cylinder on said return stroke of said piston, said throw axis moving along a plane which is substantially parallel to said plane of movement of said piston during said power stroke of said piston.

2. An extruding apparatus as in claim i wherein said plane of movement of said throw axis is coincidental with said plane of movement of said piston during said power stroke of said piston.

3. An extruding apparatus as in claim 2 wherein said piston is plural and numbers two.

4. An extruding apparatus as in claim 3 wherein said bias member is a spring.

5. An extruding apparatus as in claim 3 wherein said throw is circular.

6. An extruding apparatus as in claim 5 wherein said pistons are connected to a piston mounting block, said throw being maintained in contact with said piston mounting block by said spring.

7. An extruding apparatus as in claim 6 wherein said axis of said crank is offset from said plane of movement of said pistons.

8. Method of extruding fluid from a cylinder comprising rotating a crank with a throw connected to said crank, said crank having a crank axis, said throw having a throw axis, said crank axis being offset from said throw axis, operably moving a piston within said cylinder by said throw for movement between a power and a return stroke, said piston having a plane of movement which substantially passes through said throw axis during movement of said piston on said power stroke, said plane of movement of said piston being offset to one side of said crank axis.

9. Method as in claim 8 wherein said plane of movement of said piston is coincident with said throw axis during at least a portion of said power stroke of said piston.

10. Method as in claim 9 and further comprising maintaining said piston in operable contact with said throw during said return stroke of said piston.

11. An extruding apparatus to extrude fluid from at least one cylinder, said extruding apparatus comprising a piston movable within said cylinder between power and return strokes, a crank rotatable about a crank axis and a throw mounted to said crank, said throw having a throw axis and being rotatable about said crank axis, said throw axis being offset from said crank axis, said apparatus further comprising a bias member operable to move said piston into operable contact with said throw during said return stroke of said piston.

12. An extruding apparatus as in claim 11 wherein said bias member is a spring.

13. An extruding apparatus as in claim 12 wherein said piston is plural and numbers two.

14. An extruding apparatus as in claim 13 wherein movement of said throw axis coincides with the plane of movement of said pistons.

15. An extruding apparatus as in claim 14 wherein said pistons are connected to a piston mounting block, said throw being maintained in contact with said piston mounting block by said spring.

16. An extruding apparatus as in claim 15 wherein said piston mounting block has a relief angle and a trailing edge.

17. An extruding apparatus as in claim 16 wherein said relief angle is provided on said trailing edge of said piston mounting block.

* * * * *